United States Patent [19]

Van Gilst et al.

[11] 4,337,728

[45] Jul. 6, 1982

[54] PROGRAMMED HOG FEEDER AND PROCESS

[75] Inventors: Carl Van Gilst; Howard S. Brembeck, both of Goshen; Bradley E. Donahoe, Elkhart, all of Ind.

[73] Assignee: Chore-Time Equipment, Inc., Milford, Ind.

[21] Appl. No.: 236,831

[22] Filed: Feb. 23, 1981

Related U.S. Application Data

[63] Continuation of Ser. No. 63,425, Aug. 3, 1979, abandoned.

[51] Int. Cl.³ .............................................. A01K 5/02
[52] U.S. Cl. ................................ 119/51 R; 119/51.11; 119/51.5; 119/52 AF
[58] Field of Search ............... 119/51 R, 51.11, 51.12, 119/56 R, 51.5, 75

[56] References Cited

U.S. PATENT DOCUMENTS

| | | | |
|---|---|---|---|
| 3,157,157 | 11/1964 | Clay et al. | 119/51.11 |
| 3,269,358 | 8/1966 | Hawley | 119/51.12 |
| 3,359,947 | 12/1967 | Biehl | 119/51.12 |
| 3,386,418 | 6/1968 | Biehl | 119/51 R |
| 3,786,785 | 1/1974 | Olde | 119/51.5 X |

FOREIGN PATENT DOCUMENTS

1037323  8/1978  Canada .............................. 119/51 R

*Primary Examiner*—Hugh R. Chamblee

*Attorney, Agent, or Firm*—Trexler, Bushnell & Wolters, Ltd.

[57] ABSTRACT

A method of feeding hogs is disclosed. The method includes the steps of providing all the hogs with all the feed they care to consume for a limited feeding period of time, and thereafter denying all feed to all the hogs for a limited feedless period of time. Preferably, weaner hogs are provided with all the feed they care to consume during three separated, limited feeding periods of approximately two hours each per day. These feeding periods are alternated with three feedless periods during which all feed is denied to all the small hogs. This feeding regime is maintained until the hogs weigh approximately 100 pounds. Thereafter, two limited feeding periods are provided each day until the hogs reach market weight. In this way, hog weight gain per day is maximized and the amount of feed consumed per pound of hog weight gained is minimized.

Apparatus for carrying out this feeding method is also disclosed. The apparatus includes a feed pan or trough, a high capacity feed delivery conveyor, and a timed feed shut-off means interposed between the feed trough means and the feed delivery conveyor for alternatively delivering and preventing delivery of feed to the feed trough. If desired, a water nozzle can be located above the feed trough to deliver water to the hogs during a feeding period. A timed water shut-off means can be interposed between the water nozzle and the water delivery pipe for alternately permitting and preventing delivery of water to the water nozzle.

16 Claims, 4 Drawing Figures

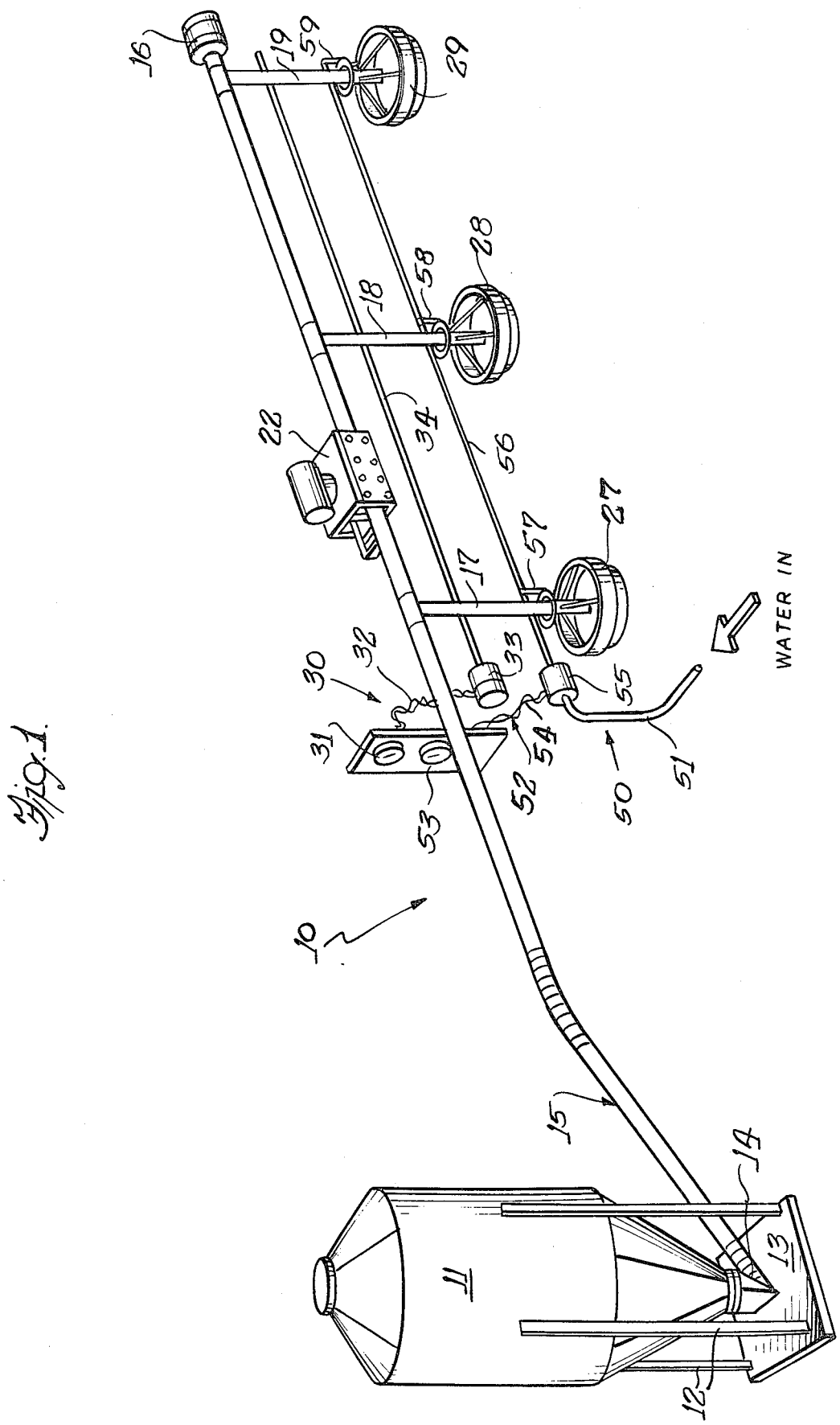

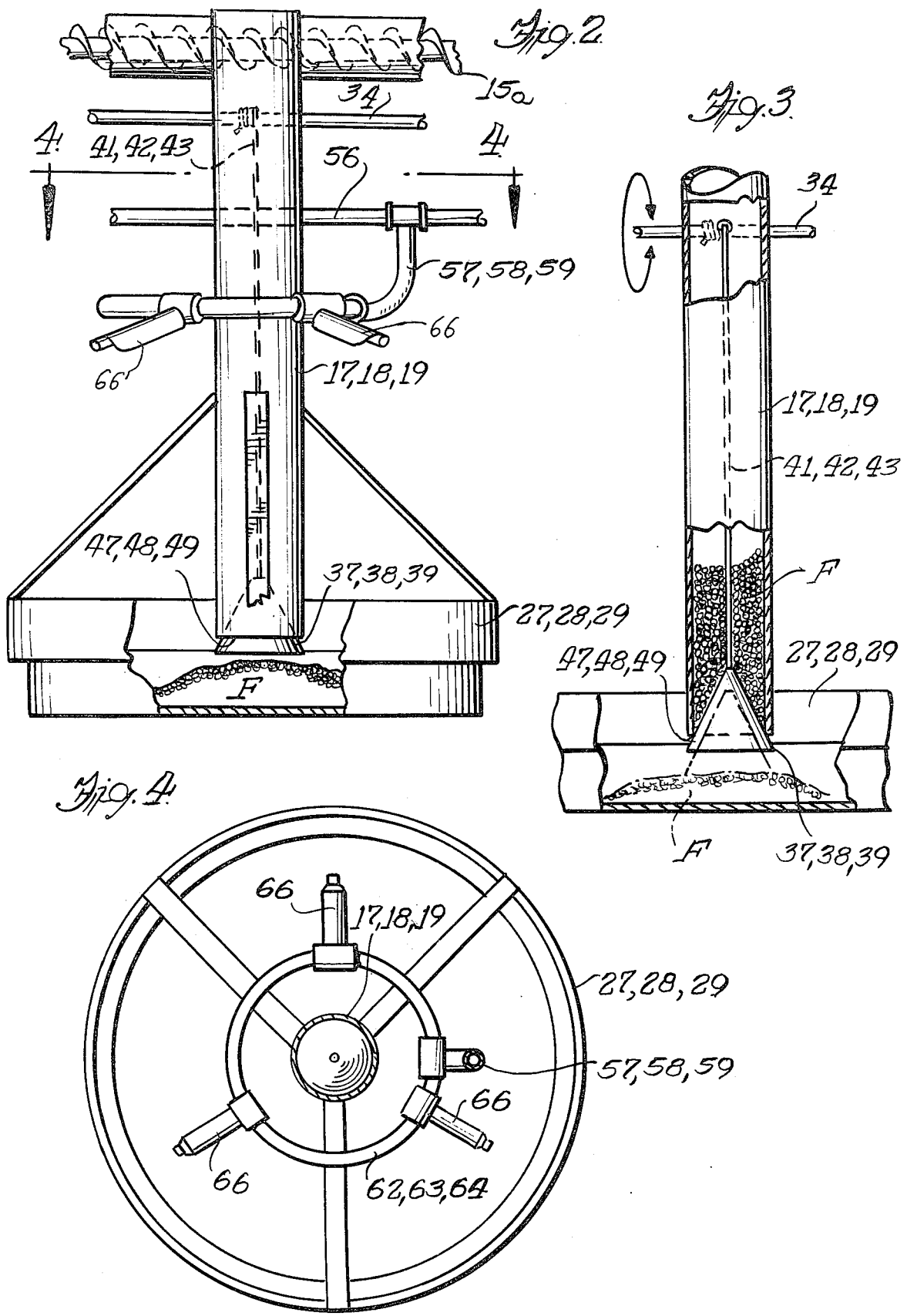

PROGRAMMED HOG FEEDER AND PROCESS

This application is a continuation of application Ser. No. 063,425, filed Aug. 3, 1979 now abandoned.

DESCRIPTION OF THE INVENTION

This invention relates generally to methods and apparatus for feeding hogs, and more particularly concerns methods and apparatus for feeding hogs which provide improvements in hog growth rate, while also improving the yield; that is, improving the ratio of feed delivered to hog weight added.

Hog husbandry has been practiced by mankind for thousands of years. In the relatively recent past, systematic, scientific attempts have been made to raise hogs from sucklings or weaners to fully adult size as rapidly as possible, and with the minimum amount of feed. In this way, the maximum number of hogs are produced during a given period of time with minimum feed and other expenses. Since feed costs presently represent approximately 70% of the total cost of producing pork, the development of feeding systems and methods which maximize feed efficiency without sacrificing growth rate—or, indeed, which actually improve growth rate—will be of great benefit to hog husbandmen.

Generally speaking, hog feeding plans can be divided into three general classes. These include:

(1) Random feeding

In this regimen, hogs are provided with quantities of feed at times decided upon without regard to animal growth. These times may be, for example, any time the swineherd can find food for his animals, as is sometimes the case in Third World countries. Sometimes more feed is provided than the hogs can consume, and sometimes less feed is provided. Sometimes, irregular amounts of feed are provided at regular intervals set for the convenience of the swineherd, or for other convenient reasons. In such regimens, the basic fact that hogs must eat to live and grow is recognized, but little further feed planning is done.

(2) Ad libitum feeding

In this methodology, hogs are permitted free access to feed at all times. The feed providing troughs or areas are always kept at least partially filled with feed so that the hogs can eat as much feed as they wish to consume at any time.

(3) Limit feeding

In this methodology, specific quantities of feed are provided to hogs at specific intervals of time. In accordance with previous hog growth and care research, these quantities of feed are always less than the hogs desire, or could consume. Some programs deliver the feed rations at specific moments, and permit the hogs to consume the rations whenever they wish.

Under at least some of these feeding schemes, water has also been provided to the animals. Normally, unlimited supplies of water are made available to the hogs at all times. Under some feeding plans, liquid has been mixed with the feed when it is delivered to form a gruel.

Research involving the feeding and care of poultry and other domesticated animals has been conducted, of course. While the purposes and results of some such research might first appear to be at least superficially similar to hog care research, such is not usually the case. The great differences in animal anatomy, metabolism and digestive systems between hogs and most other animals makes the transfer of data and conclusions from research involving other animals to hog research and feeding programs an extremely dangerous step. Useful approaches taken in the feeding of other animals do not necessarily work when applied to hogs, and can, indeed, harm the hogs.

It is the general object of the present invention to provide improved methods and apparatus for feeding hogs.

More specifically, it is an object of the present invention to provide methods and apparatus for feeding hogs which will improve the growth rate of the hogs.

It is another object of the invention to provide methods and apparatus which will decrease the number of pounds of feed required to be fed to a given hog to provide a given number of pounds of weight gain in that hog.

It is a related object to provide improved methods and apparatus for hog feeding which will reduce the wastage of feed delivered to the hogs.

Other objects and advantages of the invention will become apparent upon reading the following detailed description and upon reference to the drawings. Throughout the drawings, like reference numerals refer to like parts.

BRIEF DESCRIPTION OF THE DRAWINGS

FIG. 1 is a perspective view showing a novel combined hog feeding and hog watering system which can be utilized to practice the novel feeding and watering methods of the present invention;

FIG. 2 is a fragmentary side elevational view of a hog feeding trough and watering station and associated apparatus;

FIG. 3 is a fragmentary elevational view in partial section showing portions of the feed delivery system; and FIG. 4 is a sectional view taken substantially in the plane of line 4—4 in FIG. 2 and showing in yet further detail the hog feeding and watering apparatus.

DETAILED DESCRIPTION

While the invention will be described in connection with a preferred embodiment, it will be understood that it is not intended to limit the invention to this embodiment. On the contrary, it is intended to cover all alternatives, modifications and equivalents as may be included within the spirit and scope of the invention as defined by the appended claims.

Turning first to FIG. 1, there is shown the novel combination feeding and watering apparatus 10 embodying one aspect of the present invention. In general, this apparatus 10 includes a large storage bin 11, which here is carried by legs 12 upon a suitable foundation 13. At the bottom of this bin 11 is a boot 14, and extending from the boot 14 is a header conveyor 15. The conveyor 15 can be of the type which carries a rotatable auger member 15a (FIG. 2) within a hollow conveyor tube. Here, this auger 15a is driven by an electric motor 16 or other suitable power source. Feed which is drawn from the bin 11 by the header conveyor 15 is delivered to drop tubes 17, 18 and 19. A box mechanism 22 can be provided to control feed flow over relatively long stretches of the conveyor 15.

As can be envisioned from FIGS. 1–3, feed discharge down the drop tubes 17, 18 and 19 flows to subjacent hog feeding troughs 27, 28 and 29. In accordance with one aspect of the invention, this feed delivery system has a high capacity so as to deliver at least as much feed to the feed troughs 27-29 as the hogs can consume from the troughs in a given period of time.

In accordance with another of the broad aspects of the invention, this feed is delivered to the consumption troughs 27, 28, 29 on a predetermined time schedule. To this end, a feed delivery and delivery shut-off system 30 is interposed between the feed troughs 27-29 and the feed delivery conveyor 15 for alternately permitting and preventing delivery of feed to the feed troughs 27-29. Here the shut-off system 30 includes a timer 31 connected, as by wires 32, to an electric motor 33. The electric motor 33 drives a wind-up shaft 34. Below each tube 17-19, a cone-shaped feed delivery stop valve member 37-39 is provided, and is attached to the wind-up shaft 34 by a flexible rope or cord 41, 42 and 43. These cords 41, 42 and 43 are routed from the stop valve members through small apertures in the drop tubes 17, 18 and 19 to the shaft 34. When the motor 33 turns the wind-up shaft 34 at preselected times, the cords 41, 42 and 43 are simultaneously unwound off the shaft 34 and the stop members 37, 38 and 39 are taken away from the respective discharge openings 47, 48, 49 provided at the bottom of each of the drop tubes 17, 18 and 19. In this way, the feed F in the conveyor 15 and drop tubes 17-19 is rapidly discharged to the respective troughs 27-29 at a predetermined time. Later, the motor motion is reversed to pull the feed flow shut-off stopper 37-39 back to their closed positions. It will be understood that other embodiments of feed shut-off systems can be employed. For example, the valve cords 41, 42 and 43 could be attached to a master pull cord operated by a motor or other pull and release mechanism. Other convenient shut-off devices could be used.

In the preferred mode of operation, the conveyor motor 16 is first energized, and feed is drawn along the conveyor 15. Usually their action causes the upstream drop tube 17 to first fill with feed, and the second most upstream drop tube 18 next fills with feed. The downstream tube 19 is the last to be filled. It will be understood that this sereatum-order tube filling usually occurs regardless of the number of drop tubes to be filled by the conveyor, the filling order progressing from the first upstream tube to the last downstream tube. After all the tubes are filled the timer 31 operates the tube valve motor 33. All the cone valves 37, 38 and 39 open simultaneously and feed is thus delivered to all the pans or troughs 27-29 simultaneously. In this way, the hogs are discouraged from rushing to the first or upstream pan 27 when feed delivery begins.

In carrying out the invention, an interrelated hog watering system 50 can be included to still further improve hog development performance. The illustrated watering system includes a water delivery pipe 51 which is sized so as to deliver at least as much water to the hogs as the hogs can consume. A water shut-off system 52 is interposed within this pipeline 51. Here, the shut-off system 52 includes a timer 53 connected, as by wires 54, to a valve 55 interposed in the pipeline 51 so as to operate the shut-off valve 55 at predetermined times. Preferably, the shut-off valve 55 is operated to begin delivery of water before feed delivery starts, and to halt water delivery after feed delivery ends.

Water passing the valve 55 is routed to a downstream header pipe 56 and thence to drop tubes 57, 58 and 59. Water traveling down each of these drop tubes 57-59 flows to an endless ring 62, 63 and 64 and to nozzles 66.

It will be noted that these nozzles 66 are mounted directly above the feed pans or troughs 27-29. In this way, water from each nozzle falls into the subjacent trough to mix with the feed contained there. This water and feed mixing action provides a number of benefits. First, it inhibits loss of feed by bored hogs who might otherwise be tempted to play with the feed and throw feed out of the troughs. Second, this gruel mixture of feed and water may improve hog gain characteristics. Third, water which emanates from the nozzles 66 and is not consumed directly by the hogs is not wasted, as might be the case if the described nozzle-trough relationships were not provided. Fourth, water spillage and consequent mess is minimized.

If desired, these nozzles 66 can be of the spray-head variety so as to deliver a spray of water directly to the hogs and to the feed during the entire time period when water is being provided through the shut-off valve 55. Alternatively, the nozzles 66 can be of the demand variety which permit delivery of water directly into the hog's mouth only when the hog actuates the valve.

The described apparatus can be used to provide a novel method of hog feeding and watering. This method encourages maximum feed utilization and more rapid hog weight gain than was heretofore believed possible. In accordance with this aspect of the invention, all the hogs are provided with all the feed they care to consume for a limited feeding period of time, and thereafter all the hogs are denied all access to any feed for a limited feedless period of time. Preferably, three feeding periods are alternated with three feedless periods each day until the weaner hogs have reached an approximate gross weight of 100 pounds, and thereafter two feeding periods are alternated with two feedless periods each day until the hogs reach their finished or market weight.

More specifically, feed is delivered through the system so that all the hogs may eat as much feed as they wish to consume for about two hours. At the end of the feeding period, feed delivery through the system to the hogs is terminated. After the hogs have consumed any minor amount of feed remaining in the troughs, they can obtain no further feed for some six hours. At the expiration of this feedless time, feed is again provided for about two hours. A second feedless period of about six hours leads to a two hour feeding period. A last feedless period of six hours completes the day.

After the hogs have reached a weight of about 100 pounds, two feeding periods per day are provided, each period lasting about two hours. These two feeding periods are separated by feedless periods of about ten hours each. These feeding schedules are maintained over as many consecutive days as are required to reach the desired hog market weights. The feeding and feedless periods begin and end at the same time each day.

In carrying out the invention, all the hogs are provided with all the water they care to consume during each feeding period. All the hogs are denied any water during each feedless period.

In order to describe the invention even more fully, the nature and results of several experiments or test trials are discussed below. It will be understood that it is not intended to limit the scope of the invention to the following information.

The first trial test compared the performance of hogs fed on a three-feeding-per-day schedule versus the performance of hogs fed on a two-feedings-per-day schedule versus the performance of hogs fed on an ad libitum schedule. The performance of hogs fed with dry feed only was also compared to the performance of hogs to which water was made available to wet the feed. Results are shown in Tables I to IV.

TABLE I

Feed Consumed and Feed Consumed Per Pound of Hog Weight Gain - By Period & Cumulative
All Data are shown in pounds unless otherwise indicated

| | | Period I | | Period II | | | |
|---|---|---|---|---|---|---|---|
| | | Feed | | Feed Consumed | | Feed/Gain | |
| Feed Regimen | Pen | Consumed | Feed/Gain | (Period) | (Cumm.) | (Period) | (Cumm.) |
| 2×/day-wet | 1 | 456 | 3.04 | 591 | 1047 | 2.70 | 2.84 |
| (8am;8pm) | 2 | 442 | 2.80 | 591 | 1033 | 2.55 | 2.65 |
| Average | | | 2.92 | | | 2.62 | 2.74 |
| Feed/Pig/Day | | 4.7 | | 5.3 | 5.0 | | |
| 3×/day-wet | 3 | 422 | 3.01 | 594 | 1016 | 2.75 | 2.85 |
| (8am;4pm;12 midnight) | 4 | 422 | 2.89 | 594 | 1016 | 2.82 | 2.85 |
| Average | | | 2.95 | | | 2.78 | 2.85 |
| Feed/Pig/Day | | 4.4 | | 5.3 | 4.9 | | |
| Average-wet | | 4.5 | 2.94 | 5.3 | 5.0 | 2.70 | 2.80 |
| Ad Libitum | 5 | 586 | 3.37 | 654 | 1240 | 2.68 | 2.97 |
| | 6 | 550 | 3.12 | 630 | 1180 | 2.90 | 3.00 |
| Average | | | 3.24 | | | 2.79 | 2.98 |
| Feed/Pig/Day | | 5.9 | | 5.7 | 5.8 | | |
| 3×/day-dry | 7 | 434 | 2.93 | 594 | 1028 | 2.80 | 2.86 |
| (8am;4pm;12 midnight) | 8 | 431 | 3.04 | 594 | 1025 | 2.54 | 2.73 |
| Average | | | 2.98 | | | 2.67 | 2.80 |
| Feed/Pig/Day | | 4.5 | | 5.3 | 4.9 | | |
| 2×/day-dry | 9 | 440 | 2.86 | 591 | 1031 | 2.76 | 2.80 |
| (8am;8pm) | 10 | 440 | 2.68 | 591 | 1031 | 2.87 | 2.79 |
| Average | | | 2.77 | | | 2.82 | 2.80 |
| Feed/Pig/Day | | 4.6 | | 5.3 | 5.0 | | |
| Average-dry | | 4.5 | 2.88 | 5.3 | 5.0 | 2.74 | 2.80 |

TABLE II

Feed Consumed and Feed Consumed Per Pound of Hog Weight Gain - By Period & Cumulative
All Data are shown in pounds unless otherwise indicated

| | | Period III | | | | Period IV | | | |
|---|---|---|---|---|---|---|---|---|---|
| | | Feed Consumed | | Feed/Gain | | Feed Consumed | | Feed | |
| Feed Regimen | Pen | (Period) | (Cumm.) | (Period) | (Cumm.) | (Period) | (Cumm.) | (Period) | (Cumm.) |
| 2×/day-wet | 1 | 706 | 1753 | 2.84 | 2.84 | 728 | 2481 | 2.91 | 2.86 |
| (8am;8pm) | 2 | 706 | 1739 | 2.67 | 2.66 | 728 | 2467 | 3.14 | 2.78 |
| Average | | | | 2.76 | 2.75 | | | 3.02 | 2.82 |
| Feed/Pig/Day | | 6.3 | 5.5 | | | 6.5 | 5.7 | | |
| 3×/day-wet | 3 | 706 | 1722 | 2.94 | 2.89 | 728 | 2450 | 3.43 | 3.03 |
| (8am;4pm;12 midnight) | 4 | 706 | 1722 | 3.06 | 2.93 | 728 | 2450 | 3.34 | 3.04 |
| Average | | | | 3.00 | 2.91 | | | 3.38 | 3.04 |
| Feed/Pig/Day | | 6.3 | 5.4 | | | 6.5 | 5.7 | | |
| Average-wet | | 6.3 | 5.4 | 2.88 | 2.83 | 6.5 | 5.7 | 3.20 | 2.93 |
| Ad Libitum | 5 | 705 | 1945 | 2.67 | 2.85 | 685 | 2630 | 3.53 | 3.00 |
| | 6 | 660 | 1840 | 2.78 | 2.92 | 710 | 2550 | 4.13 | 3.18 |
| Average | | | | 2.72 | 2.88 | | | 3.83 | 3.09 |
| Feed/Pig/Day | | 6.1 | 5.9 | | | 6.2 | 6.0 | | |
| 3×/day-dry | 7 | 706 | 1734 | 2.87 | 2.86 | 728 | 2462 | 3.28 | 2.97 |
| (8am;4pm;12 midnight) | 8 | 706 | 1731 | 2.94 | 2.81 | 728 | 2459 | 3.31 | 2.94 |
| Average | | | | 2.90 | 2.84 | | | 3.30 | 2.96 |
| Feed/Pig/Day | | 6.3 | 5.4 | | | 6.5 | 5.7 | | |
| 2×/day-dry | 9 | 706 | 1737 | 3.30 | 2.98 | 728 | 2465 | 3.37 | 3.09 |
| (8am;8pm) | 10 | 706 | 1737 | 2.56 | 2.69 | 728 | 2465 | 3.60 | 2.91 |
| Average | | | | 2.93 | 2.84 | | | 3.48 | 3.00 |
| Feed/Pig/Day | | 6.3 | 5.4 | | | 6.5 | 5.7 | | |
| Average-dry | | 6.3 | 5.4 | 2.92 | 2.84 | 6.5 | 5.7 | 3.39 | 2.98 |

TABLE III

Average Daily Weight Gain - By Period and Cumulative
All Data are shown in pounds unless otherwise indicated

| | | Period I | | | Period II | | |
|---|---|---|---|---|---|---|---|
| | | 12/17 | 12/29 | A.D.G.* | 1/12 | A.D.G.* | |
| Treatment | Pen | Wt. | Wt. | (Period) | Wt. | (Period) | (Cumm.) |
| 2×/day-wet | 1 | 786 | 936 | 1.56 | 1155 | 1.96 | 1.77 |
| (8am;8pm) | 2 | 702 | 860 | 1.65 | 1092 | 2.07 | 1.88 |
| Average/Pig | | 93 | 112 | 1.60 | 140 | 2.01 | 1.82 |
| 3×/day-wet | 3 | 804 | 944 | 1.46 | 1160 | 1.93 | 1.71 |
| (8am;4pm;12 midnight) | 4 | 804 | 950 | 1.52 | 1161 | 1.88 | 1.72 |
| Average/Pig | | 100 | 118 | 1.49 | 145 | 1.91 | 1.71 |
| Average-wet | | | | 1.55 | | 1.96 | 1.77 |
| Ad Libitum | 5 | 824 | 998 | 1.81 | 1242 | 2.18 | 2.01 |

TABLE III-continued

Average Daily Weight Gain - By Period and Cumulative
All Data are shown in pounds unless otherwise indicated

| Treatment | Pen | Period I | | | Period II | | |
|---|---|---|---|---|---|---|---|
| | | 12/17 Wt. | 12/29 Wt. | A.D.G.* (Period) | 1/12 Wt. | A.D.G.* (Period) | A.D.G.* (Cumm.) |
| | 6 | 818 | 994 | 1.83 | 1211 | 1.94 | 1.89 |
| Average/Pig | | 103 | 124 | 1.82 | 153 | 2.06 | 1.95 |
| 3×/day-dry | 7 | 818 | 966 | 1.54 | 1178 | 1.89 | 1.73 |
| (8am;4pm;12 midnight) | 8 | 788 | 930 | 1.48 | 1164 | 2.09 | 1.81 |
| Average/Pig | | 100 | 118 | 1.51 | 146 | 1.99 | 1.77 |
| 2×/day-dry | 9 | 790 | 944 | 1.60 | 1158 | 1.91 | 1.77 |
| (8am;8pm) | 10 | 762 | 926 | 1.71 | 1132 | 1.84 | 1.78 |
| Average/Pig | | 97 | 117 | 1.66 | 143 | 1.88 | 1.77 |
| Average-dry | | | | 1.58 | | 1.93 | 1.77 |

*Average Daily Gain

TABLE IV

Average Daily Weight Gain - By Period and Cumulative
All Data are shown in pounds unless otherwise indicated

| Treatment | Pen | Period III | | | Period IV | | |
|---|---|---|---|---|---|---|---|
| | | 1/26 Wt. | A.D.G.* (Period) | A.D.G.* (Cumm.) | 2/9 Wt. | A.D.G.* (Period) | A.D.G.* (Cumm.) |
| 2×/day-wet | 1 | 1404 | 2.22 | 1.93 | 1654 | 2.23 | 2.01 |
| (8am;8pm) | 2 | 1356 | 2.36 | 2.04 | 1588 | 2.07 | 2.05 |
| Average/Pig | | 172 | 2.29 | 1.99 | 203 | 2.15 | 2.03 |
| 3×/day-wet | 3 | 1400 | 2.14 | 1.86 | 1612 | 1.89 | 1.87 |
| (8am;4pm;12 midnight) | 4 | 1392 | 2.06 | 1.84 | 1610 | 1.95 | 1.87 |
| Average/Pig | | 174 | 2.10 | 1.85 | 201 | 1.92 | 1.87 |
| Average-wet | | | 2.20 | 1.92 | | 2.04 | 1.95 |
| Ad Libitum | 5 | 1506 | 2.36 | 2.13 | 1700 | 1.73 | 2.03 |
| | 6 | 1448 | 2.12 | 1.97 | 1620 | 1.54 | 1.86 |
| Average/Pig | | 185 | 2.24 | 2.05 | 208 | 1.63 | 1.94 |
| 3×/day-dry | 7 | 1424 | 2.20 | 1.89 | 1646 | 1.98 | 1.92 |
| (8am;4pm;12 midnight) | 8 | 1404 | 2.14 | 1.92 | 1624 | 1.96 | 1.94 |
| Average/Pig | | 177 | 2.17 | 1.91 | 204 | 1.97 | 1.93 |
| 2×/day-dry | 9 | 1372 | 1.91 | 1.82 | 1588 | 1.93 | 1.85 |
| (8am;8pm) | 10 | 1408 | 2.46 | 2.02 | 1610 | 1.80 | 1.96 |
| Average/Pig | | 174 | 2.19 | 1.92 | 200 | 1.87 | 1.91 |
| Average-dry | | | 2.18 | 1.91 | | 1.92 | 1.92 |

*Average Daily Gain

The results of the first trial test indicated a five percent faster gain using the two-feedings-per-day-with-wetted-feed regimen than with the ad libitum feeding regimen, as the hogs grew from 100 pounds to 200 pounds. At the same time, the hogs fed on the two-a-day-wet-feed program added each pound of weight gained with ten percent less feed.

The second trial test compared a wetted two-per-day feeding program with ad libitum feedings as hogs grew from 45 pounds to 210 pounds. The results are shown in Tables V and VI. Some comparisons of cumulative average daily gains between the regimes or programs are set out in Table VII.

TABLE V

Treatment 1
WET FEED 2×/DAY
All Data shown in pounds

| | A.D.G.* | (Cumm.) | Feed Efficiency | (Cumm.) |
|---|---|---|---|---|
| PERIOD 1 | 1.47 | — | 2.47 | — |
| PERIOD 2 | 1.75 | 1.61 | 2.66 | 2.57 |
| PERIOD 3 | 1.94 | 1.72 | 2.94 | 2.70 |
| PERIOD 4 | 1.65 | 1.68 | 3.47 | 2.90 |
| PERIOD 5 | 1.48 | 1.66 | 3.64 | 3.03 |
| PERIOD 6 | 1.84 | 1.69 | 3.47 | 3.11 |
| PERIOD 7 | 1.75 | 1.70 | 3.78 | 3.20 |

*Average Daily Gain

TABLE VI

Treatment 2
DRY AD LIBITUM
All Data shown in pounds

| | A.D.G.* | (Cumm.) | Feed Effic- iency | (Cumm.) | Temp. Ave. HI | Temp. Ave. LO |
|---|---|---|---|---|---|---|
| Period 1 | 1.54 | — | 2.36 | — | | |
| Period 2 | 1.68 | 1.60 | 2.67 | 2.52 | | |
| Period 3 | 1.90 | 1.71 | 2.62 | 2.56 | 76.2 | 59.7 |
| Period 4 | 1.56 | 1.67 | 3.44 | 2.75 | 85.9 | 64.4 |
| Period 5 | 1.54 | 1.64 | 3.46 | 2.89 | 89.4 | 69.0 |
| Period 6 | 1.66 | 1.64 | 3.51 | 2.99 | 83.5 | 59.0 |
| Period 7 | 1.61 | 1.65 | 3.79 | 3.09 | 80.0 | 62.9 |

*Average Daily Gain

TABLE VII

| Cumulative Average Daily Gain in Pounds - Treatments 1 and 2 | | |
|---|---|---|
| PERIOD 1-2 | 1.61 | 1.60 |
| PERIOD 1-3 | 1.72 | 1.71 |
| PERIOD 1-4 | 1.68 | 1.67 |
| PERIOD 2-7 | 1.73 | 1.65 |
| PERIOD 3-7 | 1.68 | 1.58 |

The third test utilized modified equipment for more accurate testing. A programmed feed regimen was compared to an ad libitum program. In the programmed feed plan, hogs were fed three times per day until they weighed 100 pounds, and then were fed two times per day until they reached market weight. Results are shown in Table VIII.

wastage from the programmed feed trough and other equipment problems. There was some indication of better results at heavier hog weights than at lighter weights.

Results for the programmed feeding regime used in the third trial test are also shown in Table IX.

TABLE IX

POUNDS OF FEED CONSUMED PER DAY
PER PIG PER POUND OF WEIGHT GAINED

| | PEN | 1 | 2 | 3 | 4 | 5 | 6 | 7 | 8 | 9 | 10 |
|---|---|---|---|---|---|---|---|---|---|---|---|
| Pro- | 1 | 5.51 | 3.04 | 6.24 | 3.28 | 5.72 | 3.27 | 6.11 | 3.72 | 6.19 | 3.89 |
| grammed | 2 | 5.46 | 2.94 | 6.16 | 3.33 | 6.04 | 3.16 | 6.60 | 4.23 | 6.43 | 4.17 |
| Feeding | 3 | 5.55 | 2.83 | 6.17 | 3.61 | 5.95 | 3.20 | 6.70 | 3.49 | 6.52 | 4.29 |
| | 4 | 5.46 | 2.98 | 6.04 | 3.18 | 6.01 | 3.56 | 6.68 | 3.41 | 6.58 | 4.16 |
| | 5 | 5.98 | 2.90 | 6.67 | 3.90 | 6.02 | 3.32 | 6.94 | 4.11 | 6.49 | 5.19 |
| Average | | 5.59 | 2.94 | 6.26 | 3.46 | 5.95 | 3.30 | 6.61 | 3.79 | 6.44 | 4.34 |
| Ad | 6 | 5.43 | 3.23 | 5.63 | 3.45 | 6.21 | 3.61 | 7.10 | 4.18 | 6.35 | 4.50 |
| Libitum | 7 | 5.42 | 3.52 | 5.80 | 3.84 | 5.58 | 3.58 | 7.28 | 4.55 | 5.85 | 3.85 |
| Feeding | 8 | 5.13 | 2.85 | 5.80 | 3.15 | 6.70 | 3.43 | 7.68 | 4.71 | 6.61 | 3.78 |
| | 9 | 5.03 | 2.83 | 5.89 | 3.31 | 6.03 | 3.37 | 6.74 | 4.99 | 6.73 | 3.83 |
| | 10 | 6.69 | 3.35 | 6.25 | 3.34 | 6.43 | 3.55 | 6.74 | 4.08 | 6.03 | 4.37 |
| Average | | 5.54 | 3.16 | 5.87 | 3.42 | 6.18 | 3.51 | 7.11 | 4.50 | 6.31 | 4.06 |

TABLE VIII

AVERAGE DAILY GAIN BY PERIOD
All Data are shown in pounds per hog per day

| | Pen | 1 | 2 | 3 | 4 | 5 | 6 | Cumulative Average Gain |
|---|---|---|---|---|---|---|---|---|
| Programmed Feeding | 1 | 1.81 | 1.90 | 1.75 | 1.64 | 1.59 | 1.61 | 1.72 |
| | 2 | 1.86 | 1.85 | 1.91 | 1.56 | 1.54 | 1.64 | 1.73 |
| | 3 | 1.96 | 1.71 | 1.86 | 1.92 | 1.52 | 1.76 | 1.79 |
| | 4 | 1.83 | 1.90 | 1.69 | 1.96 | 1.58 | 1.76 | 1.79 |
| | 5 | 2.06 | 1.71 | 1.81 | 1.69 | 1.25 | 1.46 | 1.66 |
| Treatment Average | | 1.90 | 1.81 | 1.80 | 1.75 | 1.50 | 1.65 | 1.74 |
| Average Weight | | 103.6 | 129 | 154 | 178.9 | 200 | 223 | |
| Ad Libitum Feeding | 6 | 1.68 | 1.63 | 1.72 | 1.70 | 1.41 | 1.24 | 1.56 |
| | 7 | 1.54 | 1.48 | 1.56 | 1.60 | 1.52 | 1.35 | 1.51 |
| | 8 | 1.80 | 1.87 | 1.95 | 1.63 | 1.75 | 1.72 | 1.79 |
| | 9 | 1.78 | 1.79 | 1.35 | 1.76 | 1.36 | 1.36 | 1.64 |
| | 10 | 2.00 | 1.87 | 1.81 | 1.65 | 1.38 | 1.56 | 1.71 |
| Treatment Average | | 1.76 | 1.73 | 1.77 | 1.59 | 1.56 | 1.45 | 1.64 |
| Average Weight, pounds per hog | | 106 | 130.2 | 155 | 177.1 | 199 | 219.4 | |

For this trial test period, the wet, twice-daily feeding program showed a three percent improvement in rate of gain over the ad libitum regime. However, the wet, twice-daily feeding program showed a feed conversion rate three percent poorer than the ad libitum program. This poorer feed conversion rate was attributed to feed The programmed feeding regime resulted in a six percent faster rate of weight gain and a six percent better feed conversion rate than did the control ad libitum feeding plan.

A fourth trial test utilized automated equipment and the same feeding regime. A control group was fed on an ad libitum regime. Results are shown in Table X.

TABLE X

| | EXPERIMENTAL GROUP | | | CONTROL GROUP | | |
|---|---|---|---|---|---|---|
| | Average Daily Gain | Feed Per Pig Per Day | Pounds Feed Per Pound Gain | Average Daily Gain | Feed Per Pig Per Day | Pounds Feed Per Pound Gain |
| Period #1 5/17–5/31 | 1.33 | 3.39 | 2.55 | 1.42 | 4.28 | 3.01 |
| Period #2 5/31–6/14 | 1.18 | 4.11 | 3.48 | 1.41 | 3.70 | 2.63 |
| Period #3 6/14–6/28 | 1.81 | 4.55 | 2.52 | 1.69 | 4.75 | 2.76 |
| Period #4 6/28–7/12 | 1.53 | 4.89 | 3.19 | 1.57 | 5.17 | 3.29 |
| Period #5 7/12–7/26 | 1.62 | 5.19 | 3.20 | 1.55 | 5.88 | 3.79 |
| Period #6 7/26–8/9 | 1.71 | 5.81 | 3.40 | 1.60 | 6.05 | 3.78 |

TABLE X-continued

| | EXPERIMENTAL GROUP | | | CONTROL GROUP | | |
|---|---|---|---|---|---|---|
| | Average Daily Gain | Feed Per Pig Per Day | Pounds Feed Per Pound Gain | Average Daily Gain | Feed Per Pig Per Day | Pounds Feed Per Pound Gain |
| Average | 1.53 | 4.58 | 2.99 | 1.54 | 4.97 | 3.22 |

Malfunctions inadvertently experienced during the trial test left the hogs on the programmed regime without feed at times. As a result, the rates of hog weight gain were about equal. However, the hogs on programmed regime had a feed conversion rate eight percent better than the hogs fed on the ad libitum regime.

By using this method of hog feeding, it has been found that hogs generally gain weight more rapidly and require less feed than was previously necessary. These improvements mean direct improvement in profits to hog raising operations.

The invention is claimed as follows:

1. A method of feeding and raising hogs from the weaner stage to market stage, comprising the steps of providing all the weaner hogs with all the feed they care to consume during three separate, limited feeding periods per day, and thereafter denying all feed to all the weaner hogs for three limited feedless periods per day until the hogs weigh approximately 100 pounds, and thereafter providing all the hogs with all the feed they care to consume for two separated, limited feeding periods of time per day and thereafter denying all feed to all the hogs for two limited feedless periods of time per day until the hogs reach market weight.

2. A method of feeding hogs according to claim 1 wherein at least one feeding period extends for approximately two hours, and wherein at least one feedless period extends for approximately six hours.

3. A method of feeding hogs according to claim 1 wherein said feeding periods and feedless periods are provided for a plurality of consecutive days, and wherein said method includes the steps of beginning and ending said feeding periods and feedless periods at the same time each day.

4. A method of feeding hogs according to claim 1 wherein said feedless period is longer in time duration than said feeding period.

5. A method of feeding hogs according to claim 1 wherein each of said feedless periods is longer in time duration than any of said feeding periods.

6. A method of feeding hogs according to claim 1 including the steps of providing all the hogs with all the water they care to consume during the feeding period.

7. A method of feeding hogs according to claim 1 including the step of providing all the water to said hogs which they care to consume only during said feeding periods.

8. A method according to claim 1 including the steps of providing the feed to said hogs at a given location, providing the water to said hogs at a location above the feeding location, and collecting water spilled from the water delivery location at the hog feeding location so as to form a water-feed gruel for consumption by the hogs.

9. A method of feeding hogs, comprising the steps of providing the hogs with all the feed they care to consume for not more than three separate limited feeding periods of time per day, and denying all feed to the hogs for not more than three separate limited feeding periods of time per day, at least one feeding period extending for approximately two hours and at least one feedless period extending for approximately six hours, whereby to maximize hog weight gain and minimize the amount of feed consumed by each hog per pound of weight gained by that hog.

10. A method of feeding hogs, comprising the steps of providing the hogs with all the feed they care to consume for at least three separate limited feeding periods of time per day, and denying all feed to the hogs for at least three separate limited feeding periods of time per day, at least one feeding period extending for approximately two hours and at least one feedless period extending for approximately six hours, whereby to maximize hog weight gain and minimize the amount of feed consumed by each hog per pound of weight gained by that hog.

11. A method of feeding hogs according to claim 9 or 10 wherein said feeding periods and feedless periods are provided for a plurality of consecutive days, and wherein said method includes the steps of beginning and ending said feeding periods and feedless periods at the same time each day.

12. A method of feeding hogs according to claim 9 or 10 wherein each of said feedless periods is longer in time duration than any of said feeding periods.

13. A method of feeding hogs according to claim 9 or 10 including the steps of providing all the hogs with all the water they care to consume during the feeding period.

14. A method of feeding hogs according to claim 9 or 10 including the additional step of denying all water to all the hogs during said feedless periods.

15. A method of feeding hogs comprising the steps of providing the hogs with all the feed and water they care to consume for a plurality of limited feeding period of time each day, and thereafter denying feed and water to the hogs for a limited feedless period of time between successive feeding periods, whereby to maximize hog weight gain and minimize the amount of feed consumed by each hog per pound of weight gained by that hog.

16. A method of feeding hogs, comprising the steps of providing the hogs with all the feed and water they care to consume for a plurality of limited feeding periods of time each day, commencing to make drinking water available to the hogs before each feeding period begins and halting the availability of water to the hogs after each feeding period ends, thereby providing a plurality of limited feedless and waterless periods of time each day, whereby to maximize hog weight gain and minimize the amount of feed consumed by each hog per period of weight gained by that hog.

* * * * *